United States Patent
Todasco (10) Patent No.: US 9,936,127 B2
(45) Date of Patent: Apr. 3, 2018

(54) SYSTEMS AND METHODS FOR PROVIDING ATTENTION DIRECTING FUNCTIONS IN AN IMAGE CAPTURING DEVICE

(71) Applicant: PAYPAL, INC., San Jose, CA (US)

(72) Inventor: Michael Charles Todasco, Santa Clara, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 14/930,459

(22) Filed: Nov. 2, 2015

(65) Prior Publication Data

US 2017/0126963 A1  May 4, 2017

(51) Int. Cl.
| | |
|---|---|
| H04N 5/232 | (2006.01) |
| H04N 5/225 | (2006.01) |
| G03B 17/56 | (2006.01) |
| G03B 15/00 | (2006.01) |

(52) U.S. Cl.
CPC ....... *H04N 5/23222* (2013.01); *H04N 5/2251* (2013.01); *H04N 5/23219* (2013.01); *H04N 5/23293* (2013.01); *G03B 15/00* (2013.01); *G03B 17/568* (2013.01)

(58) Field of Classification Search
None
See application file for complete search history.

(56) References Cited

U.S. PATENT DOCUMENTS

| | | | | |
|---|---|---|---|---|
| 2009/0066835 A1* | 3/2009 | Chen | ...................... | H04N 5/225 348/370 |
| 2011/0134269 A1* | 6/2011 | Kim | ................... | H04N 5/23293 348/222.1 |
| 2012/0182460 A1* | 7/2012 | Nagashima | .......... | H04N 5/2251 348/345 |
| 2014/0267817 A1* | 9/2014 | Zerovec | ............. | H04N 5/23216 348/220.1 |
| 2015/0098001 A1* | 4/2015 | Takayama | .......... | H04N 5/23293 348/333.02 |
| 2015/0189186 A1* | 7/2015 | Fahn | .................... | G06K 9/4671 348/239 |
| 2016/0050387 A1* | 2/2016 | Kitahara | ............ | H04N 5/23222 348/231.3 |
| 2016/0219182 A1* | 7/2016 | Chien | .................. | H04N 1/2112 |
| 2016/0337582 A1* | 11/2016 | Shimauchi | ......... | H04N 5/23206 |

* cited by examiner

*Primary Examiner* — Justin P Misleh
(74) *Attorney, Agent, or Firm* — Haynes and Boone, LLP (57) ABSTRACT

An image capturing device/system is provided with attention directing functions for directing attentions of imaging targets. In particular, the image capturing device may include a presentation device, such as a visual or an audio presentation device. The presentation device may be provided on a side of the image capturing device facing the imaging targets when the image capturing device captures the images of the imaging targets. The presentation device may be configured to display or output a presentation before and/or during an image capturing process to direct the attentions of the imaging targets toward the image capturing device.

20 Claims, 6 Drawing Sheets

SYSTEMS AND METHODS FOR PROVIDING ATTENTION DIRECTING FUNCTIONS IN AN IMAGE CAPTURING DEVICE

BACKGROUND

Field of the Invention

The present invention generally relates to an image capturing device, and in particular, an image capturing device with presentation functions for directing the attention of imaging targets.

Related Art

A user of an image capturing device may use the image capturing device to capture images of various imaging targets including persons. When capturing images of persons, it is often preferable that the persons look in the directions of the image capturing device. However, the persons (e.g., children) may not be interested in looking in the direction of the image capturing device or may not know when to look at the image capturing device. As such, it may be difficult for the user of the image capturing device to capture satisfactory images of the persons. Thus, there is a need for an improved image capturing device that includes functions for directing the attention of imaging targets.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to an embodiment, an image capturing device/system is provided with attention directing functions for directing the attention of one or more imaging targets. In particular, the image capturing device may include a presentation device, such as a visual or an audio presentation device. The presentation device may be provided on a side of the image capturing device facing the imaging targets when the image capturing device captures the images of the imaging targets (as used herein, "imaging targets" includes one or more live targets, which can include persons or animals).

The presentation device may be configured to display or output a presentation before and/or during an image capturing process to direct the attention of the imaging targets towards the image capturing device. For example, the presentation device may display a video including audio output to attract and direct the attention of the imaging targets whose image is to be taken toward the image capturing portion of the image capturing device and provoke a desired expression if possible. The presentation may be displayed a few seconds before and/or during the image capturing process such that the imaging targets look at the image capturing device when the images are captured.

In an embodiment, the presentation may be customized based on the imaging targets whose image is to be captured by the image capturing device. For example, the image capturing device may detect and recognize, e.g., by facial or voice recognition, the person or persons whose image is to be taken. The image capturing device may determine and/or customize the presentation to be presented to better attract the attention of the imaging targets, including provoking a desired expression, such as laughter, smile, surprise, etc. For example, the image capturing device may present video or audio of cartoon characters to attract the attention of a child or children if a child or children are identified in the imaging targets. The presentation may include various types of images, animations, and/or audio based on the type, number, location, time, and/or context of the imaging targets. For example, if the imaging targets include multiple persons of a certain age, the presentation may include a countdown to the image capturing moment, such that the people in the group may know when to look at the image capturing device.

In an embodiment, the image capturing device or system may determine the presentation to be presented to the imaging targets based on user (person operating device or imaging targets) history, social media, and/or context. For example, the image capturing device may collect a person's presentation preferences based on the person's online or media activities, including browsing history, app usage, location, social network profiles, personal profiles, and the like. The presentation preferences also may be determined by crowd sourcing, such as preferred presentations by other users of similar type, age, gender, demography, and the like.

In an embodiment, the presentation may be determined based on context, such as location, setting, group dynamic, and the like. The presentation may be determined or selected based on where and when the image capturing process is taking place. For example, if near a meal time, food related images may be used to attract imaging target's attention.

In an embodiment, the presentation may be customized to attract attention of multiple persons. For example, if the imaging target includes a group of people, the presentation may be selected or determined based on the group's shared interests. In another example, the group's interest may be prioritized based on various characteristics. For instance, younger persons may have higher priority, because younger persons may have lower attention span compared with older persons.

In an embodiment, the image capturing device may detect and analyze the attention status and/or movement of the imaging targets and may determine the presentation in real time to capture the attention of the imaging targets, as needed. For example, the image capturing device may detect where the imaging target is looking and may determine and present attention attracting presentation accordingly.

Figure 1:
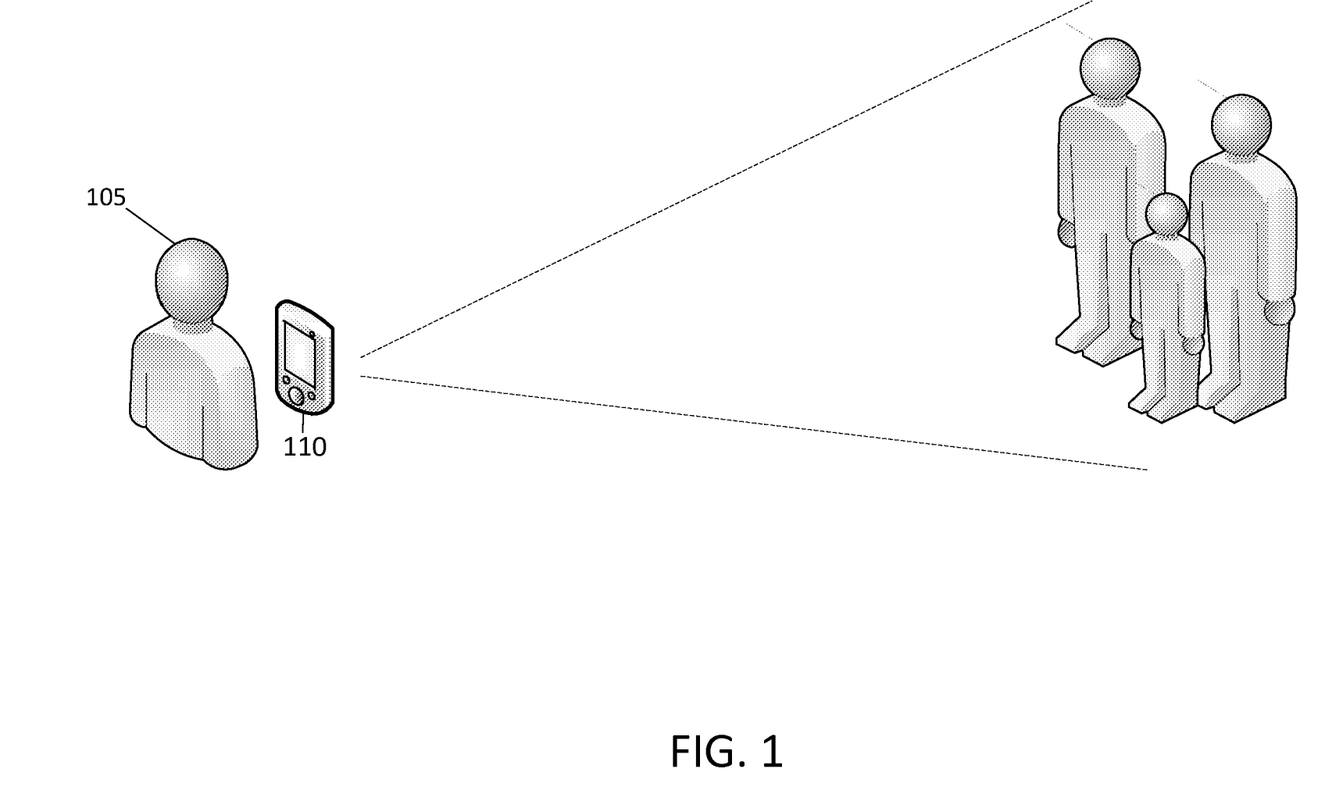
FIG. 1 is a diagram illustrating an imaging capturing device capturing images of an imaging target according to an embodiment.

FIG. 1 is a diagram illustrating an imaging capturing device capturing images of imaging targets according to an embodiment. In particular, a user 105 may operate an image capturing device 110 to capture images of an imaging target. As shown in FIG. 1, the imaging target may include a person or persons or an animal or animals. The user 105 may prefer that the person or persons in the imaging target look in the direction of the image capturing device 110 during an imaging capturing process, such that the faces of the persons may be captured by the image capturing device 110. In an embodiment, the image capturing device 110 may include a presentation device, such as a visual display or an audio output device, configured to output a presentation to direct the attention of the persons in the imaging target towards the image capturing device 110. The presentation device may output the presentation before or during the image capturing process to direct and/or retain the attention of the persons in the imaging target.

Figure 2A:
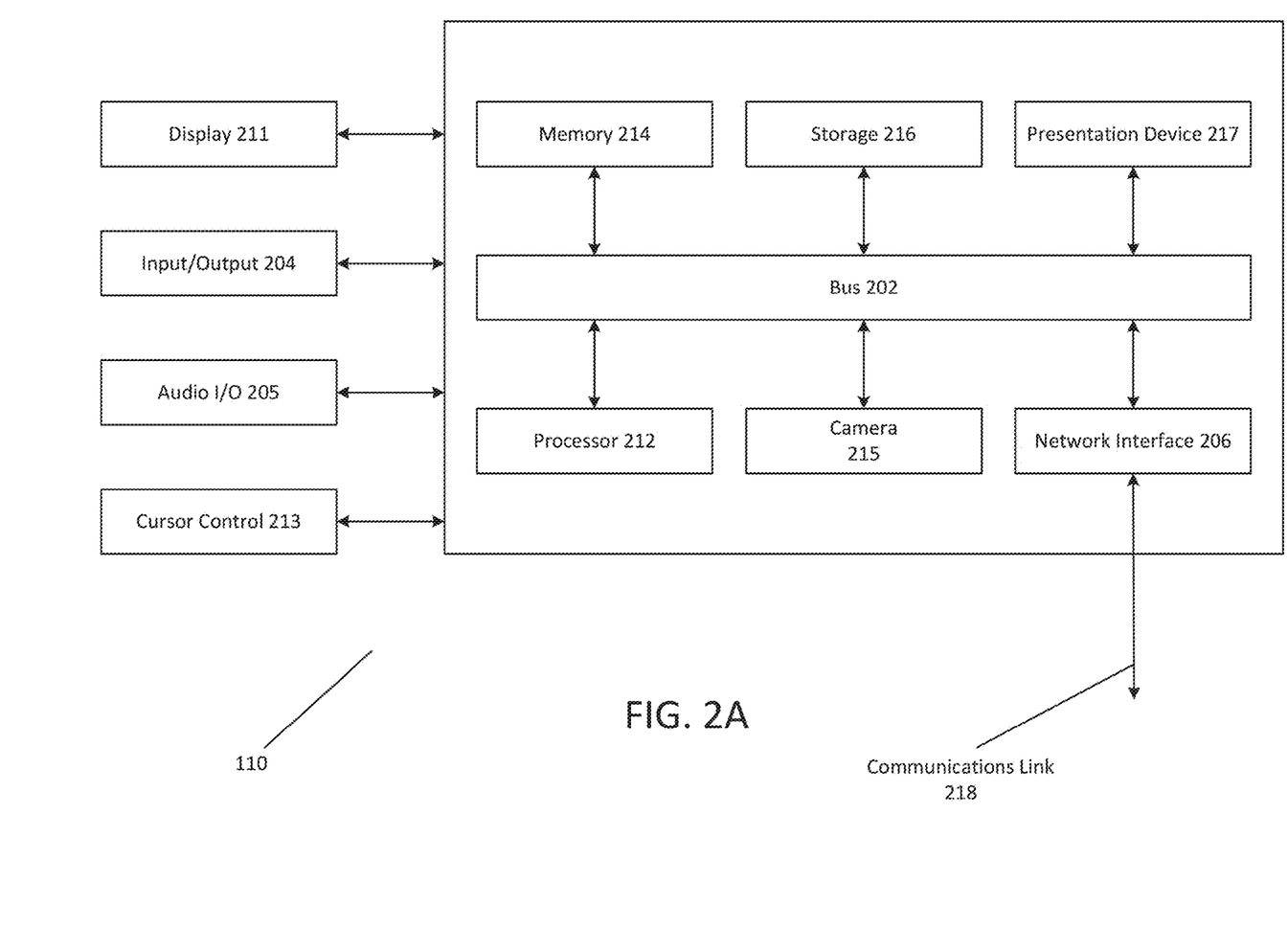
FIG. 2A is a functional block diagram of an image capturing device suitable for implementing attention directing presentations for imaging targets according to an embodiment.

FIG. 2A is a functional block diagram of an image capturing device 110 suitable for implementing attention directing presentations for imaging targets according to an embodiment. In various implementations, the image capturing device 110 may comprise a personal computing device (e.g., smart phone, a computing tablet, a personal computer, laptop, wearable device, Bluetooth device, key FOB, badge, etc.) capable of communicating with an electronic communication network.

Image capturing device 110 includes a bus 202 or other communication mechanism for communicating information data, signals, and information between various components of image capturing device 110. Components include an input/output (I/O) component 204 that processes a user action, such as selecting keys from a keypad/keyboard, selecting one or more buttons or links, user gestures detected on a touch screen, etc., and sends a corresponding signal to bus 202. I/O component 204 may also include an output component, such as a display 211 and a cursor control 213 (such as a keyboard, keypad, mouse, touch screen, etc.). An optional audio input/output component 205 may also be included to allow a user to use voice for inputting information by converting audio signals. Audio I/O component 205 may allow the user to hear audio.

A transceiver or network interface 206 transmits and receives signals between image capturing device 110 and other devices, such as another user device, an application server, or a service provider server via an electronic communication network. In one embodiment, the transmission is wireless, although other transmission mediums and methods may also be suitable. A processor 212, which can be a micro-controller, digital signal processor (DSP), or other processing component, processes these various signals, such as for display on image capturing device 110 or transmission to other devices via a communication link 218. Processor 212 may also control transmission of information, such as cookies or IP addresses, to other devices.

The image capturing device 110 may include a camera 215. The camera 215 may be configured to capture images. In particular, the camera 215 may be a digital camera including an image sensor, optical components such as mirrors, lenses, and the like, configured to direct light to form an image on the image sensor, a shutter configured to capture a scene, an aperture configured to adjust an amount of exposure, and the like. The image sensor may be one or more of a semiconductor Charge-Coupled Device (CCD), a complementary metal oxide-semiconductor (CMOS), or the like. Images captured on the image sensor may be displayed on display 211 of the image capturing device 110. Thus, the display 211 may be used as a viewfinder. A viewfinder may allow a user to view the imaging target from which images are to be captured by the image capturing device 110. A flash may be provided to illuminate and/or provide additional lighting on the imaging target. The camera 215 may be controlled by the processor 212 to capture images. Images captured by the camera may be converted into digital signals/data and stored in a memory 214. The camera 215 may also have video capturing capabilities, e.g., having a video mode, as is common in smartphones, digital cameras, and computing tablets.

The image capturing device 110 may include a presentation device 217. The presentation device 217 may be configured to present or output audio, still images, and/or video to an imaging target, such as a person or persons (or a pet) whose image is to be captured (which includes both still images and video) by the image capturing device 110. The presentation may direct and/or retain the attention of the imaging target during the image capturing process. The presentation device 217 may include one or more visual output devices, such as one or more of a display screen, a lighting device, a visual indicator, or other devices configured to output visual presentations or signals, such as a video presentation, lighting patterns, and the like. For example, the presentation device 217 may include a Liquid-Crystal Display (LCD) screen configure to display images and/or videos. Lighting devices, such as Laser Emitting Diodes (LED), may also be included and configured to display lighting patterns. In an embodiment, the presentation 217 may include one or more audio output devices, such as audio speakers or other devices, configured to output audio presentation or signals, such as sound, music, alarms, and the like. In an embodiment, the presentation device 218 may include vibration functions configured to output a vibration or patterns of vibration to direct and/or retain the attention of the imaging target. The presentation device 217 may be positioned to face the imaging target when the camera 215 is capturing an image of the imaging target. The presentation device 217 may be controlled by the processor 212 to output presentations to the imaging target.

Figure 2B:
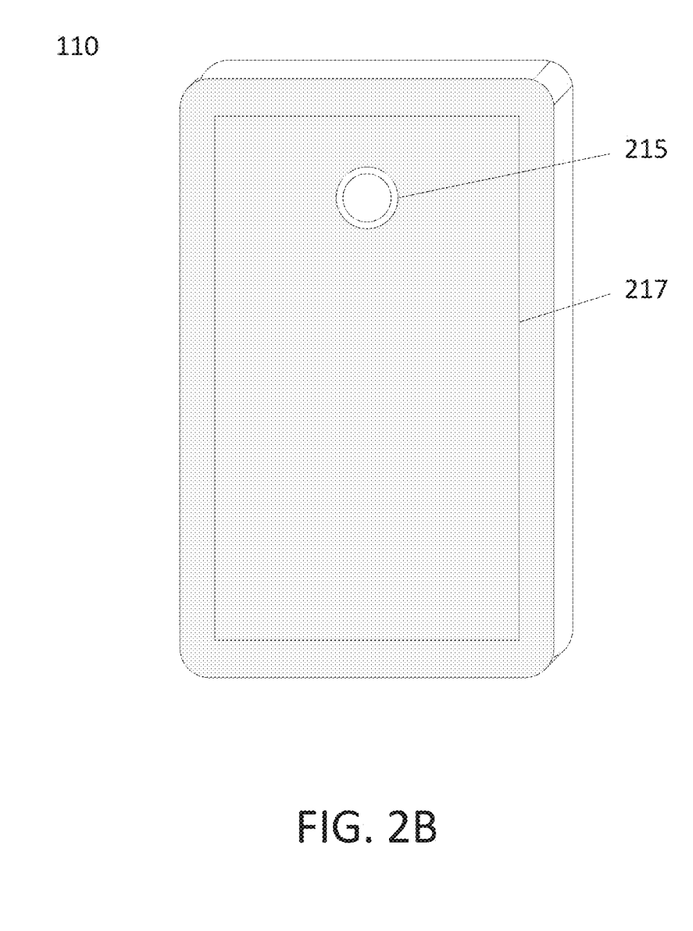
FIG. 2B is a perspective view of an image capturing portion of an image capturing device according to an embodiment.

FIG. 2B is a perspective view of a front side of the image capturing device 110 according to an embodiment. The camera 215 and the presentation device 217, e.g., a display screen may be arranged at a front side of the image capturing device 110. As such, during an image capturing device, the camera 215 and the presentation device 217 may both face the imaging target. The camera 215 may capture images or videos of the imaging target while the presentation device 217 may output presentations to the imaging target to direct and/or retain the attention of the imaging target. In an embodiment, the camera 215 may be surrounded by the presentation device 217, as shown in FIG. 2B. As such, the presentation device 217 may display an animation to direct attention toward the camera 215. In some embodiments, the presentation device 217 may output both visual and audio presentations to direct and/or retain the attention of the imaging target.

Components of image capturing device 110 also include a system memory component 214 (e.g., RAM), a static storage component 216 (e.g., ROM), and/or a presentation device 217. Image capturing device 110 performs specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and transmission media. In various implementations, non-volatile media includes optical or magnetic disks, volatile media includes dynamic memory, such as system memory component 214, and transmission media includes coaxial cables, copper wire, and fiber optics, including wires that comprise bus 202. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by image capturing device 110. In various other embodiments of the present disclosure, a plurality of computer systems coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Figure 2C:
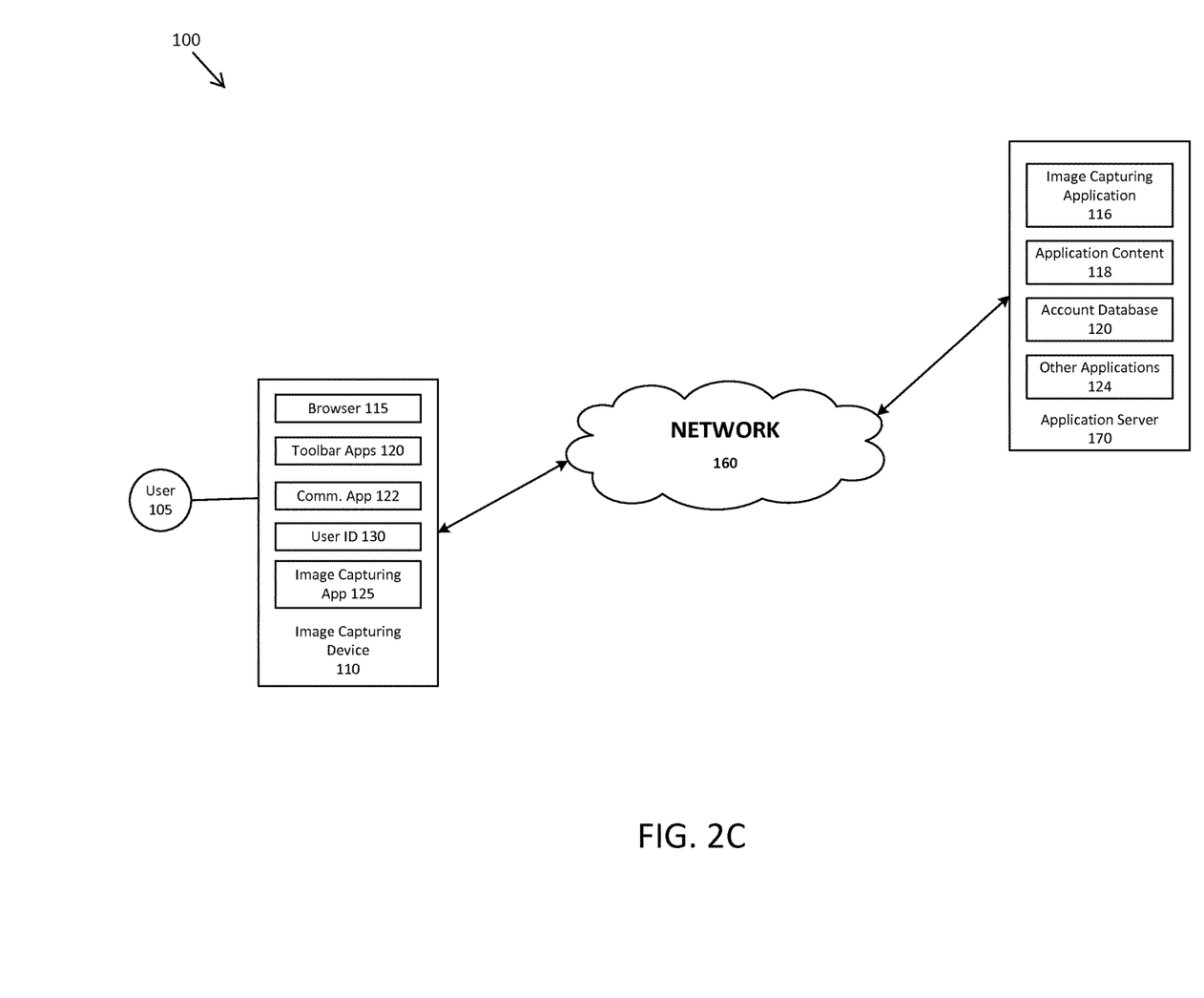
FIG. 2C is a block diagram of a networked system including an imaging capturing device suitable for implementing attention directing presentations for imaging targets according to an embodiment.

FIG. 2C is a block diagram of a networked system including an imaging capturing device 110 suitable for implementing attention directing presentations for imaging targets according to an embodiment. Networked system 100 may comprise or implement a plurality of servers and/or software components that operate to perform various payment transactions or processes, even though only one server (application server 170) is shown in the figure. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include the image capturing device 110 and an application server 170 in communication over a network 160. Application server 170 may be maintained by a software company that develops and/or offers various applications or services related to image capturing devices. A user 105, such as an operator or owner of the image capturing device, may utilize the image capturing device 110 to download and install applications offered at the application server 170. For example, user 105 may utilize image capturing device 110 to connect to the application server 170 to manage contact information. Although only one application server is shown, a plurality of application servers may be utilized.

Image capturing device 110 and application server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

Image capturing device 110 may include hardware and software configured for wired and/or wireless communication over network 160. For example, in one embodiment, the image capturing device 110 may be implemented as a digital camera, a personal computer (PC), a smart phone, wearable device, laptop computer, and/or other types of computing devices capable of transmitting and/or receiving data, such as an iPad™ or an iPhone™ from Apple™.

Image capturing device 110 may include a communication module including hardware and applications for facilitating communications between image capturing device 110 and other communication devices. The communication module may include hardware, such as CPU processor, WiFi card, Bluetooth Module, Ethernet card, and the like, for various wired and wireless communications including communication via LAN, WLAN, PTSN, LTE, 4G, or 3G network, and/or various other wired or wireless networks, including telecommunications, mobile, and cellular phone networks. Image capturing device 110 also may include a social interaction monitoring module including a CPU processor, applications, the communication module, location detection device, and/or various sensors for monitoring user 105 activities at image capturing device 110 and identifying social interactions conducted by user 105. Image capturing device 110 may include a relationship module including the CPU processor, applications, and memory storing relationship database for inferring context and relationship between user 105 and other users. In addition, image capturing device 110 may include a natural language processing module including the CPU processor and applications for processing and analyzing text-based communications to extract context and relationship from the communications.

Image capturing device 110 also may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for online shopping and/or merchant sites for viewing and purchasing goods and services. Image capturing device 110 may also include one or more toolbar applications 120 which may be used, for example, to provide client-side processing for performing desired tasks in response to operations selected by user 105. In one embodiment, toolbar application 120 may display a user interface in connection with browser application 115. Image capturing device 110 also may include other applications to perform functions, such as email, texting, voice and IM applications that allow user 105 to send and receive emails, calls, and texts through network 160, as well as applications that enable the user to communicate, transfer information, or make transactions.

Image capturing device 110 may include one or more user identifiers 130 which may be implemented, for example, as operating system registry entries, cookies associated with browser application 115, identifiers associated with hardware of image capturing device 110, or other appropriate identifiers, such as used for payment/user/device authentication. In one embodiment, user identifier 130 may be used to associate user 105 with a particular application account at the application server 170. A communications application 122, with associated interfaces, enables image capturing device 110 to communicate within system 100.

Image capturing device 110 may include an image capturing app 125 configured to implement various functions related to image capturing. For example, the image capturing app 125 may provide an interface for the user 105 to operate the image capturing device 110 to capture images of various imaging targets. Various settings for image capturing, such as aperture, flash, image capturing mode, color tone, image capturing theme/style, shutter speed, and the like, also may be adjusted by the user 105 through the image capturing app 125.

The image capturing app 125 also may provide functions for outputting attention directing presentations to imaging targets. The content of the attention directing presentations may be selected by the user 105. In some embodiments, the image capturing app 125 may automatically determine the content of the presentation based on presentation preferences of the imaging target, attention status of the imaging target, and the like. A presentation preference profiles may be generated for a person to store the person's presentation preferences. The presentation preferences may be determined based on the person's device activities, usage history, social network, and the like.

Image capturing device 110 also may include a location detection device and applications for collecting location data, such as geo-location data via Global Positioning System (GPS), in-door location via Bluetooth Low Energy (BLE) and/or Near-Field Communication (NFC). Image capturing device 110 also may include various sensors for detecting temperature data, altitude data, humidity data, data regarding device movement, ambient sound data, imaging data via a camera, and etc. Further, geo-fencing or wireless beacon technology may be used to define a location. Image capturing device 110 may detect signals from devices that implement geo-fencing or wireless beacon technology. These environmental data may be utilized to determine a location or environment in which image capturing device 110 is located.

Application server 170 may be maintained, for example, by a merchant or a software company which may provide applications or software contents that may be installed at consumer's computing devices to provide image capturing functionalities at the computing devices. Application server 170 may also include an account database 120 that includes account information for users having an account on application server 170, such as user 105. Account information may include basic information of users, such as name, address, phone number, email address, and the like. Account information may include image capturing settings and/or preferences of the user. Application server 170 may collect and store various contact information of users. Application server 170 also may include a database that keeps track of presentation preferences among different users.

Figure 3:
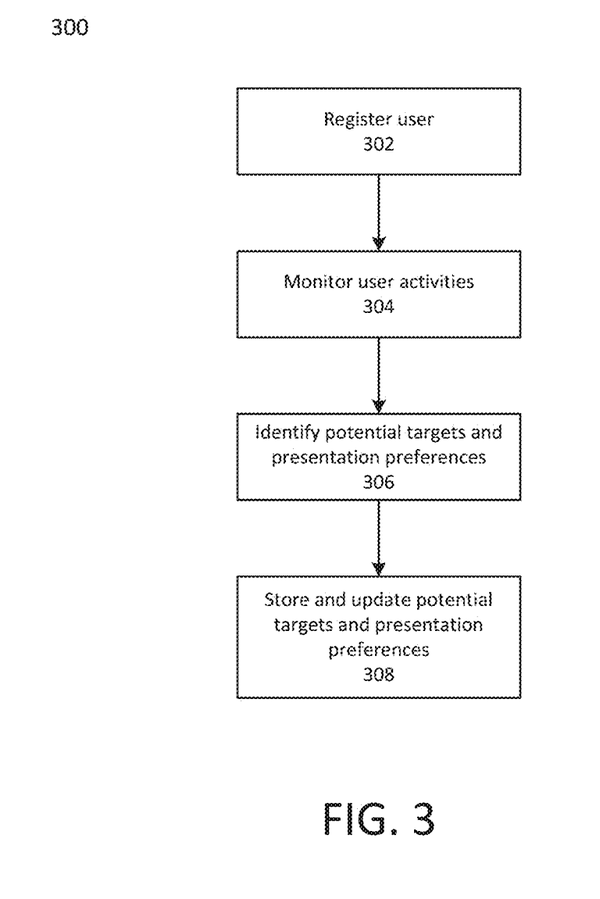
FIG. 3 is a flowchart showing a process of setting up an image capturing device attention directing functions according to an embodiment.

FIG. 3 is a flowchart showing a process of setting up an image capturing device 110 attention directing functions according to an embodiment. At step 302, a user may register the image capturing device 110 at application server 170. For example, a user may download an image capturing application form the application server 170 and may set up an account or profile for the image capturing device 110 or for the user. The account may be used for storing and managing information related to image capturing, such as image capturing settings, user preferences, presentation preferences, and the like. In an embodiment, the information may be stored and managed at the image capturing device 110. The account information may include user information, such as name, contact information, picture, birth date, gender, social network account, and other user related information. The account information also may include device information of the image capturing device 110, such as manufacturer, model number, device type, device specification, camera type, and the like.

At step 304, application server 170 and/or the image capturing device 110 may monitor user activities. In particular, image capturing device 110 may include various types of sensors that may detect user activities, such as the user's location, movements, traveling paths, gestures, and the like. For example, image capturing device 110 may include a location detection device, such as a GPS device configured to receive signals from GPS satellites to detect the location of image capturing device 110. In another example, image capturing device 110 may include a Bluetooth communication device configured to detect and receive signals from a Bluetooth beacons installed at particular locations. As such, the location of image capturing device 110 may be determined based on detecting the Bluetooth beacons. In still another example, image capturing device 110 may include a NFC device configured to detect other NFC devices located nearby. As such, when another user is located near user 105, the NFC device of image capturing device 110 may detect the NFC device of another user's device. This may allow the system to detect that user 105 is taking pictures of another user.

Further, image capturing device 110 may monitor user 105's operation on image capturing device 110, such as the user's operations to search or browse various products or services, the user's operations to communicate electronically with others, such as emails, text messages, and the like. Image capturing device 110 also may monitor user 105's operations of various applications, such as communication applications, e.g. telephone, email, or messaging applications, payment applications, shopping application, social networking applications, contact information applications, appointment or scheduling applications, and the like. Image capturing device 110 may monitor information entered or input by user 105 and information requested by user 105. In an embodiment, image capturing device 110 may detect and monitor nearby devices of other users via Bluetooth Low Energy (BLE) or other Near Field Communication (NFC) channels. For example, image capturing device 110 may be a wearable device, such as a smart watch. When user 105 is taking a picture of a friend of user 105, the system may detect via user 105's smart watch and the friend's mobile device that they are both in the same location.

At step 306, application server 170 and/or image capturing device 110 may identify potential imaging targets and their respective presentation preferences. Potential imaging targets may be identified based on social interactions with other users from the monitored user activities. Social interactions may include email messages, text messages, phone calls, social related appointments, meeting appointments, in-person meetings, telephone conferences, video conferences, and any other social related interactions between user 105 and others. The social interactions also may include interactions of users on social networking sites or apps, such as FACEBOOK, INSTAGRAM, VINE, TWITTER, VIDDY, PINTEREST, and any social networking services. Other users with whom the user 105 interacts with may be identified as potential imaging targets, as the user 105 likely may take pictures of these related persons. User activities, such as setting an appointment on a calendar, scheduling a meeting, travel or location of user 105 relative to other users, also may be used to identify potential imaging targets. In an embodiment, the system may allow user 105 to input persons as potential imaging targets.

In an embodiment, previously captured images may be analyzed to identify potential imaging targets. For example, if the user 105 frequently captures images and/or video of a family member, the family member may be identified from the images and/or videos by the system, such as via facial and/or voice recognition, and may be designated as a potential imaging target.

The system may establish a presentation preference profile for each of the imaging targets. The presentation preference profile may store personal and preference information of the imaging target. For example, the presentation preference profile may store an imaging target's (a person's) name, online user name, age, gender, demography, relationship with the user, facial features, voice patterns, online activity history, device usage, location history, transaction history, presentation preferences, and other information that may be used to identify the imaging target and to determine presentation preferences of the imaging target.

The system may determine presentation preferences of the potential imaging targets based on various factors and sources. For example, a presentation preference profile may be established for each person. The presentation preference profile may store various information defining a person's presentation preference, such as what type of presentation is likely to attract and/or retain a person's attention.

A person's presentation preferences may be determined based on the person's age, gender, demography, interests, affiliation, and the like. The presentation preferences may be determined based on a person's usage history, such as browsing history, payment history, transaction history, travel history, and the like. For example, based on a person's device usage, the person's favorite TV show, favorite sport/sport's team, music, character, and the like may be determined and be used to determine the person's presentation preference. In an embodiment, the presentation preferences may be determined by crowd sourcing, such as based on other users who are similar to the person in age, gender, demography, interest, and the like.

For example, a three-year-old boy may have cartoon characters, zoo animals, and cartoon animations as his presentation preferences. The boy's presentation preferences may be determined based on the boy's video watching history or game playing history on a smart device. The boy's presentation preferences also may be determined based on presentation preferences of other similar three-year-old boys. In another example, a pet, such as a dog or a cat, may have certain type of noises, lighting patterns, images, and/or any combination thereof as the preferred presentation.

In an embodiment, the system may determine presentation preferences by trial and error. For example, the system may select a random or potential presentation to an imaging target and detect the response of the imaging target, such as whether the imaging target's attention is directed to or remains with the image capturing device 110. This can be done by tracking the head and/or eye movements of the imaging target. As such, the system may select presentations that can better attract and/or retain the attention of a particular imaging target. The selected presentation or similar presentations may be designated in the presentation preference profile for the imaging target.

In another embodiment, the user (e.g., owner or operator of the image capturing device 110) may set or edit/revise presentation preferences. For example, for each identified potential imaging target, the user may designate one or more presentation preferences, which can be further defined by the type of reaction or expression desired from the imaging target. For example, the user may select and/or add one or more specific images, video clips, songs, recordings, etc. for laughing, serious (e.g., something that captures the attention intently but does not elicit any specific reaction), smiling, surprise (e.g., loud sounds), etc. corresponding to an image of a specific imaging target. In one example, the user taps on an image of the user's 4-year old son and sees an option to add or revise presentation preferences. Once selected, the user can download specific presentations for the son, which can include options to select specific categories of expression. In another example, the user taps on an image of the user's 2-year old girl or the user's dog and uploads or saves specific presentation preferences for each. In another embodiment, a plurality of presentation preferences may be stored or associated with a specific imaging target for all different conditions, such as expression desired, time of day, location, etc. This allows the user to generally associate preferences and then have a limited list to choose from when deciding to capture an image of the target. Even more broadly, the user may store presentation preferences generally, such that imaging targets are not associated with their own preferences. In this way, the user can select a desired presentation on a case by case (or capture by capture) basis.

At step 308, application server 170 and/or image capturing device 110 may store and update the presentation preference profiles of various imaging targets including individual persons or animals. In particular, the presentation preference profile of an imaging target may continuously be updated to reflect recent interests and popular trends. For example, popular trends in music, movies, TV shows, media and the like may be used to update and refresh the presentation preference profile. Thus, the presentations may be refreshed to better attract and/or retain the attention of the imaging target. Updates can also be made based on how many times a specific presentation is shown to a target, such as a little child. This may be needed, as the presentation may no longer attract the child's attention due to the familiarity and possible lack of interest from repeated use.

By using the above process 300, potential imaging targets may be identified and presentation preference profiles may be established for the imaging targets. Further, presentation preferences of various imaging targets may be determined and stored in the presentation preference profiles. Each image capturing device may be associated with many different imaging targets or potential imaging targets, such as friends and family members of the user of the image capturing device. Presentation preference profiles may be established for each imaging target to store each imaging target's presentation preferences.

Figure 4:
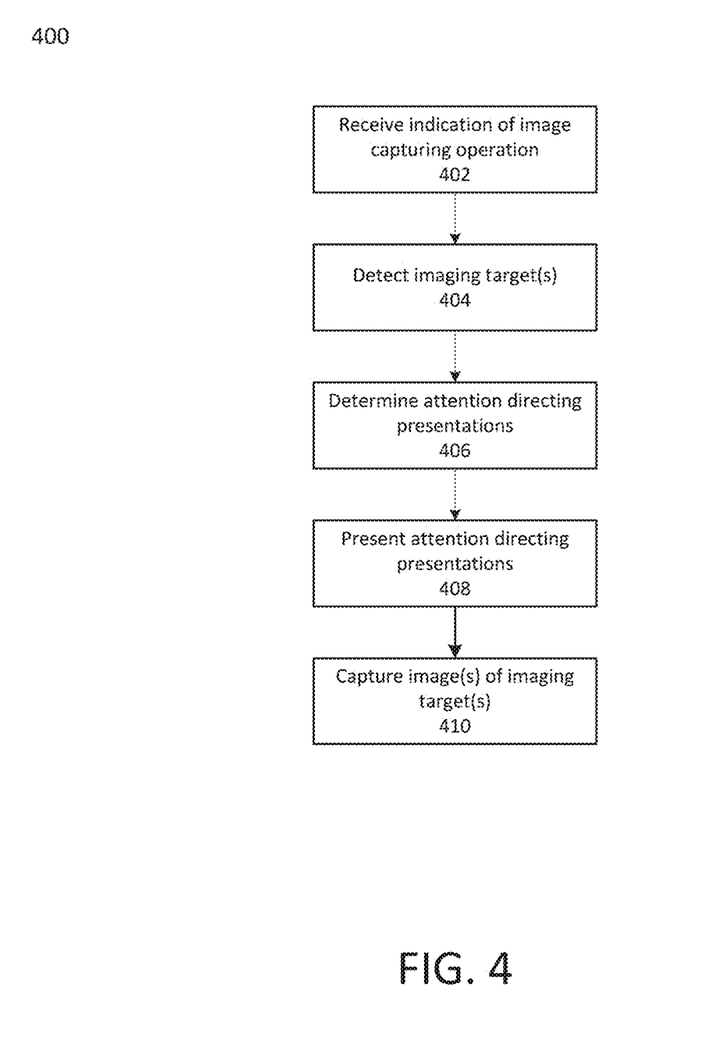
FIG. 4 is a flowchart showing a process for capturing images with attention directing functions according to one embodiment.

FIG. 4 is a flowchart showing a process for capturing images with attention directing functions according to one embodiment. At step 402, application server 170 or image capturing device 110 may receive indication of an image capturing operation. For example, the user 105 may operate the image capturing device 110 to begin an image capturing process. Depending on the type of image capturing device 110, this can be done by turning on the image capturing device 110, activating an image capturing application on the image capturing device 110, operating an image capturing button, performing a gesture on a touch screen, or the like.

At step 404, the image capturing device 110 may detect imaging targets. The user may operate the image capturing device 110 and point the camera 215 of the image capturing device 110 in a direction of the imaging target. The camera 215 may capture images of the imaging target. In particular, the images of the imaging target may be analyzed to identify the person/persons in the imaging target. For example, the identities of the person or persons in the imaging target may be determined using facial or voice recognition techniques.

In the facial recognition process, the system may first identify areas in the images that resemble faces. The system then may extract landmarks or features of the faces in the images, such as the relative position, size and/or shape of the eyes, nose, cheekbones, and jaw. The facial recognition may include a geometric approach and/or a photometric approach. The geometric approach may utilize the distinguishing features of faces for identification. The photometric approach may utilize statistical data that distill facial images into values and compare the values with templates to eliminate variances.

In voice recognition process, the system may detect the voice of the person or persons in the imaging target. The detected voice may be analyzed (and filtered by frequency filters) for patterns and frequencies which may be matched against the voice profiles of known persons. Thus, person or persons in the imaging target may be identified by his/her voice. The user may also say the name of the imaging target(s), which the system can use to match with names of stored imaging targets. For example, the user may say "Bob Smith" and "Jane Green" to identify the two imaging targets.

The image capturing device 110 may be associated with a plurality of presentation preference profile of various imaging targets, such as family members and/or friends related to the user of the image capturing device 110. The system may compare the facial images detected with those of the presentation preference profile associated with the image capturing device 110. Thus, the system may first attempt to identify any family members or friends of the user in the imaging target.

If the imaging target includes faces that do not match those in the presentation preference profiles associated with the image capturing device 110, the system may attempt to determine the age and/or gender of the person or persons in the imaging target. The age and/or gender of a person may be determined based on unique facial features statistically attribute to certain age and/or gender, such as size, hair style, relative positions of eyes, nose, hair, skin textures, and the like. Thus, the age and/or gender of the persons in the imaging target may be determined or estimated.

The imaging target may include faces of animal pets, such as cats or dogs. The system also may analyze the facial images of pets to identify a family pet, if a presentation preference profile of a family pet is established. This can be done by analyzing the facial features of the pet, including relative location, size, distances of eyes, nose, mouth, fur color, body size, body shape, and the like. If the detected animal does not match any of the presentation preference profiles associated the image capturing device, the system may determine the type of animals, such as a cat, a dot, or the like.

In an embodiment, the system may detect the attention status of the imaging target. If the imaging target includes multiple persons or animals, the system may detect the attention status of each of the persons or animals in the group. The attention status may be detected by tracking the eye movement, body movement, facing direction, and the like of the person or animal. An attention score may be assigned to a person to indicate how much attention the person is directing to the image capturing device 110. The more attention a person is paying to the image capturing device 110, the higher the attention score may be. For example, if the person is facing toward the image capturing device 110 and is looking directly at the camera, the person may be assigned a higher attention score. In contrast, if a person is looking away from the image capturing device 110 or if the face of the person is covered or is hiding behind some person objects, the person may be assigned a lower attention score. The attention score of the person may continuously updated in real time as the system detects and analyzes the person's movements and positions in real time.

At step 406, the image capturing device 110 or the application server 170 may determine attention directing presentations based on the imaging target. If a person (or pet) in the imaging target is identified to have a presentation preference profile with the system, the system may determine the content of the presentation based on the preferences stored in the presentation preference profile to attract and/or retain the person's attention before and/or during an image capturing process. The presentation preference profile may indicate specific types of sound, images, music, movies, sports teams, themes, characters, animations, patterns, or the like that are effective at attracting and/or retaining the person's attention. For example, a five-year-old girl of the user may have a presentation preference profile storing the girl's preference for certain cartoon characters, TV shows, music, or the like.

If a person (or pet) is not identified to have a presentation preference profile with the system, the system may determine the content of the presentation based on the estimated age and/or gender of the person or based on the type of animal of the pet. The system may generate or select types of presentation that can effectively attract and/or retain attention of persons of similar age and/or gender. Thus, for persons without presentation preference profiles, the content of presentation may be determined or selected based on crowd sourcing.

In an embodiment, the presentation may be determined based on the imaging target's attention status. For example, if the person of the imaging target is looking and paying attention to the image capturing device 110, the system may select or determine a presentation with moderate intensity (moderate noise or color contrast) to retain the person's attention. If the person of the imaging target is looking away from or is not paying attention to the image capturing device 110, the system may select or determine a presentation with higher intensity (louder sound or noise, flashier display) to attract or direct the person's attention toward the image capturing device 110. For example, if a child is already looking at the camera, the system may select a short cartoon video as the presentation. If the child is looking away from the camera, the system may select a video starting a loud noise (e.g., firework) or the like to attract the child's attention to the image capturing device 110.

In an embodiment, the presentation may be determined based on context, such as location, nearby events/attractions, time of the day, season, and the like. For example, if the image capturing process is occurring near an zoo, a presentation related to animals, such as animals images and sounds, may be selected. If the images are taken closer to lunch time, food related presentations may be used. If the images are taken during Christmas season, music or videos related to winter holiday may be selected.

The imaging target may include multiple persons. The system may determine a presentation based on the combined preferences of multiple persons. For example, the system may identify multiple persons in the imaging target and may determine the presentation preferences for each of the persons in the group. The system may select or determine a presentation based on the shared preferences of the group. For example, the system may determine a type of presentation that is preferred by most of the persons (majority) in the group.

In an embodiment, the system may determine a presentation based on the attention status of multiple persons. In particular, the system may determine a presentation more tailored to the persons in the group who are not paying attention to the image capturing device 110. Thus, the presentation may more effectively attract the attention of those who are not looking at the camera. For example, the preferences of persons who are not looking at the camera may be prioritized or weighted more for determining a presentation.

In an embodiment, the preferences of multiple persons may be prioritized based on various factors. For example, the preferences of multiple persons may be prioritized based on age. Presentation preferences of younger persons, such as young children, may be prioritized over preferences of older persons. This is because young children may require more help in directing and/or retaining their attention at the camera. Presentation preferences of multiple persons also may be prioritized based on the positions of persons in the imaging target. For example, preferences of persons positioned farther away from the image capturing device 110 maybe prioritized over persons positioned closer to the image capturing device 110. In another example, preferences of persons positioned on the side maybe prioritized over persons positioned near the center. This is because persons positioned farther away or on the side may require more help in directing their attention to the camera.

In an embodiment, the system may continuously modify and/or update the content of the presentation in real time based on the detected movement and/or attention status of the person or persons in the imaging target. For example, the system may monitor and keep track of the eyes and/or faces of multiple persons in the imaging target and may adjust or modify the content, intensity, speed, color contrast, and sound volume of the presentation to more effectively attract and direct the attention of the persons in real time.

The system may select from various types of presentations based on the imaging target. The presentations may include sound patterns, lighting patterns, videos, music, sound clips of animals, sound clips of vehicles, and the like. Some presentations may also include visual and/or voice count down to the image capturing moment. Some presentations may include animations that move closer to the camera as the image capturing moment approaches. Some presentations may increase in intensity (visual and/or audio) as the image capturing moment approaches. The contents of the presentations may be stored with the image capturing device 110. In some embodiments, the contents of the presentations may be stored in a presentation database at the application server 170. Once selected, the content of a presentation may be communicated from the application server 170 to the image capturing device 110.

In another embodiment, the user 105 simply selects one or more presentations through a user interface of the image capturing device 110. For example, when the user 105 opens a camera app or otherwise indicates a desire to capture an image, the user may be presented with a list of stored presentation preferences as part of the camera view, such as through an overlay. The user 105 may then tap or otherwise select a desired presentation. For example, the list may include several different songs, videos, audio recordings, images, and the like that the user can select for the particular image capturing session. Advantageously, this simplifies the process and enables more control by the user.

At step 408, the image capturing device 110 may present or output the attention directing presentations to the imaging target. In particular, the user 105 may point the camera toward the imaging target and may operate the image capturing device 110 to capture images (videos) of the imaging target. In response, the image capturing device 110 may begin to present the selected presentations to the imaging target to attract and/or retain the attention of the imaging target at the camera. The presentation may be output to the imaging target before and/or during the image capturing process. For example, the presentation may be displayed or output several seconds before the image capturing moment. In the case of a video capturing process, the presentation may be displayed and/or output before and during the video capturing period. In different embodiments, the presentation ma repeat or a next presentation may be displayed. Settings for repeat, random, or selected sequence may be set by the user.

At step 410, the image capturing device 110 may capture images of the imaging target. In particular, the image capturing device 110 may capture images along with the attention directing presentations. In some embodiments, the image capturing device 110 may display or output the presentation to the imaging target and may determine the image capturing moment (or period if video) based on the response of the imaging target. For example, the image capturing device 110 may output the presentation and may monitor the attention status of the person or persons in the imaging target and may automatically capture images (videos) when the person is looking toward the camera or when the persons in the imaging target are all looking at the camera. In another example, the image capturing device 110 may automatically capture images (videos) when the person is having a certain facial expression, such as (smile, laugh, and the like). This may ensure that the images (videos) are taken when the person or persons are looking at the camera or when the person or persons are having a certain facial expression desired by the user.

In some embodiments, the image capturing device 110 may analyze the captured images and may select images in which the imaging target is paying attention to the camera. For example, the image capturing device 110 may capture a plurality of images consecutively (burse mode) and may select images in which the person or persons are all looking at the camera. The images in which the person or persons are not all looking at the camera may be deleted.

Accordingly, the image capturing device 110 may include attention directing functions to direct and/or retain the attention of the imaging target. The content of the presentation may be customized based on the imaging target and the attention status of the persons in the imaging target to more effectively direct, attract, and/or retain the attention of the person or persons in the imaging target.

The above processes 300 and 400 may be implemented at the image capturing device 110. In an embodiment, the above processes 300 and 400 may be implemented at the application server 170. In still another embodiment, the above processes 300 and 400 may be implemented by the image capturing device 110 and the application server 170 in coordination with each other. Note that the various steps described herein may be performed in a different order, combined, and/or omitted as desired.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. An image capturing device comprising:
   a camera configured to capture an image;
   a presentation device configured to output a presentation;
   a geo-location component configured to determine a current location of the image capturing device;
   a non-transitory memory; and
   one or more hardware processors coupled to the non-transitory memory and configured to read instructions from the non-transitory memory to cause the image capturing device to perform operations comprising:
      determining, for a first potential target in a plurality of potential targets, usage data by monitoring interactions between the first potential target and the image capturing device;
      determining, for the first potential target in the plurality of potential targets, social activity data by periodically accessing activity data associated with a social network account of the first potential target from a social networking server via a network;
      retrieving the usage data and the social activity data associated with the first potential target;
      determining a target profile for the first potential target based at least on the current location of the image capturing device, the retrieved usage data, and the retrieved social activity data;
      receiving a user operation to capture an image of an imaging target;
      determining that the imaging target corresponds to the first potential target in the plurality of potential targets;
      determining, based at least in part on the derived target profile, a presentation to communicate to the imaging target;
      outputting, by the presentation device, the presentation to the imaging target; and
      during or subsequent to the outputting of the presentation, capturing, by the camera, an image of the imaging target.

2. The image capturing device of claim 1, wherein the camera and the presentation device are disposed on a same portion of the image capturing device facing the imaging target when the image capturing device is capturing the image of the imaging target.

3. The image capturing device of claim 1, wherein the presentation comprises a video presentation directing an attention of the imaging target toward the camera.

4. The image capturing device of claim 3, wherein the video presentation comprises an animation moving towards the camera as a moment of capturing the image approaches.

5. The image capturing device of claim 1, wherein the presentation comprises an audio presentation directing an attention of the imaging target toward the camera.

6. The image capturing device of claim 1, wherein the presentation increases in intensity as a moment of capturing the image approaches.

7. The image capturing device of claim 1, wherein the operations further comprise:
   identifying a plurality of persons; and
   determining a first person having a highest priority in the plurality of persons, wherein the presentation is further based on a target profile derived for the first person.

8. The image capturing device of claim 1, wherein the operations further comprise:
   retrieving demographic data associated with the; and
   obtaining presentation preferences of other users having demographic data that matches the retrieved demographic data of the, wherein determining the presentation is further based on the obtained presentation preferences of the other users.

9. The image capturing device of claim 1, wherein the operations further comprise:
   monitoring an attention status of the imaging target, wherein determining the presentation is further based on the monitored attention status of the imaging target.

10. The image capturing device of claim 9, wherein the operations further comprise:
    detecting a change of the attention status of the imaging target based on the monitoring; and
    modifying the presentation based on the detected change of the attention status of the imaging target.

11. A method for image capturing, the method comprising:
    determining, by an image capturing device for a first potential target in a plurality of potential targets, usage data by monitoring interactions between the first potential target and the image capturing device;
    determining, by the image capturing device for the first potential target in the plurality of potential targets, social activity data by periodically accessing activity data associated with a social network account of the first potential target from a social networking server via a network;
    retrieving the usage data and the social activity data associated with the first potential target;

determining a target profile for the first potential target based at least on the current location of the image capturing device, the retrieved usage data, and the retrieved social activity data;

receiving, by the image capturing device, a user operation to capture an image of an imaging target;

determining, by the image capturing device, that the imaging target corresponds to the first potential target in the plurality of potential targets;

determining, by the image capturing device based at least in part on the derived target profile, a presentation to communicate to the imaging target;

outputting, by a presentation device of the image capturing device, the presentation to the imaging target; and during or subsequent to the outputting of the presentation, capturing, by a camera of the image capturing device, an image of the imaging target.

12. The method of claim 11, further comprising:
monitoring an attention status of the imaging target, wherein determining the presentation is further based on the monitored attention status of the imaging target.

13. The method of claim 12, wherein the usage data comprises payment transactions that the first potential target performed using the image capturing device.

14. The method of claim 11, further comprising:
retrieving demographic data associated with the; and
obtaining presentation preferences of other users having demographic data that matches the retrieved demographic data of the, wherein determining the presentation is further based on the obtained presentation preferences of the other users.

15. The method of claim 11, further comprising:
identifying a plurality of persons, wherein
determining the presentation is further based on combined presentation preferences of the plurality of persons.

16. The method of claim 11, further comprising deriving an environmental context for the image capturing device based on sensor data retrieved from the image capturing device.

17. The method of claim 16, wherein the sensor data comprises at least one of altitude data, humidity data, device movement data, or ambient sound data.

18. A non-transitory machine-readable medium having stored thereon machine-readable instructions executable to cause an image capturing device to perform operations comprising:

determining, for a first potential target in a plurality of potential targets, usage data by monitoring interactions between the first potential target and the image capturing device;

determining, for the first potential target in the plurality of potential targets, social activity data by periodically accessing activity data associated with a social network account of the first potential target from a social networking server via a network;

retrieving the usage data and the social activity data associated with the first potential target;

determining a target profile for the first potential target based at least on the current location of the image capturing device, the retrieved usage data, and the retrieved social activity data;

receiving a user operation to capture an image of an imaging target;

determining that the imaging target corresponds to the first potential target in the plurality of potential targets;

determining, based at least in part on the derived target profile, a presentation to communicate to the imaging target;

outputting, by a presentation device of the image capturing device, the presentation to the imaging target; and during or subsequent to the outputting of the presentation, capturing, by a camera of the image capturing device, an image of the imaging target.

19. The non-transitory machine-readable medium of claim 18, wherein the operations further comprise increasing an intensity of the presentation as a moment of capturing the image approaches.

20. The non-transitory machine-readable medium of claim 18, wherein the operations further comprise:
monitoring an attention status of the imaging target;
detecting a change of the attention status of the imaging target based on the monitoring; and
modifying the presentation based on the detected change of the attention status of the imaging target.

* * * * *

UNITED STATES PATENT AND TRADEMARK OFFICE
CERTIFICATE OF CORRECTION

PATENT NO. : 9,936,127 B2
APPLICATION NO. : 14/930459
DATED : April 3, 2018
INVENTOR(S) : Michael Charles Todasco It is certified that error appears in the above-identified patent and that said Letters Patent is hereby corrected as shown below:

In the Claims

In Claim 8, Column 16, Line 37, change "retrieving demographic data associated with the;" to --retrieving demographic data associated with the first potential target;--.

In Claim 8, Column 16, Line 40, change "graphic data of the," to --graphic data of the first potential target,--.

In Claim 14, Column 17, Line 27, change "retrieving demographic data associated with the;" to --retrieving demographic data associated with the first potential target;--.

In Claim 14, Column 17, Line 30, change "graphic data of the," to --graphic data of the first potential target,--.

Signed and Sealed this
Twenty-fourth Day of July, 2018

Andrei Iancu
*Director of the United States Patent and Trademark Office*